United States Patent
Yun et al.

(10) Patent No.: US 11,025,108 B2
(45) Date of Patent: Jun. 1, 2021

(54) ELECTRICAL MACHINES WITH LIQUID COOLING

(71) Applicant: Hamilton Sundstrand Corporation, Charlotte, NC (US)

(72) Inventors: Thomas M. Yun, Glastonbury, CT (US); Jagadeesh Kumar Tangudu, South Windsor, CT (US)

(73) Assignee: HAMILTON SUNSTRAND CORPORATION, Charlotte, NC (US)

(*) Notice: Subject to any disclaimer, the term of this patent is extended or adjusted under 35 U.S.C. 154(b) by 46 days.

(21) Appl. No.: 16/408,051

(22) Filed: May 9, 2019

(65) Prior Publication Data
US 2020/0358325 A1 Nov. 12, 2020

(51) Int. Cl.
| | |
|---|---|
| *H02K 1/20* | (2006.01) |
| *H02K 5/20* | (2006.01) |
| *H02K 9/10* | (2006.01) |
| *H02K 9/16* | (2006.01) |
| *H02K 9/14* | (2006.01) |
| *H02K 9/00* | (2006.01) |
| *H02K 5/00* | (2006.01) |
| *H02K 9/12* | (2006.01) |

(52) U.S. Cl.
CPC ............. *H02K 1/20* (2013.01); *H02K 5/20* (2013.01); *H02K 5/00* (2013.01); *H02K 9/00* (2013.01); *H02K 9/10* (2013.01); *H02K 9/12* (2013.01); *H02K 9/14* (2013.01); *H02K 9/16* (2013.01)

(58) Field of Classification Search
CPC .. H02K 1/20; H02K 5/00; H02K 5/20; H02K 9/00; H02K 9/10; H02K 9/12; H02K 9/14; H02K 9/16

USPC ............................. 310/52, 54, 55, 58, 59, 64
See application file for complete search history.

(56) References Cited

U.S. PATENT DOCUMENTS

| | | | |
|---|---|---|---|
| 5,939,808 A | 8/1999 | Adames | |
| 8,922,072 B2 | 12/2014 | Bott et al. | |
| 9,299,488 B2 | 3/2016 | Shepard et al. | |
| 9,467,023 B2 | 10/2016 | Pal | |
| 9,468,131 B2 | 10/2016 | Brandt et al. | |
| 9,819,247 B2* | 11/2017 | Leberle | H02K 9/197 |
| 10,225,960 B2 | 3/2019 | Shepard et al. | |
| 2009/0009013 A1* | 1/2009 | Baumann et al. | H02K 9/00 310/54 |

(Continued)

FOREIGN PATENT DOCUMENTS

| | | |
|---|---|---|
| EP | 3076526 B1 | 9/2018 |
| WO | 2016113565 A1 | 7/2016 |

OTHER PUBLICATIONS

European Search Report for Application No. 19212181.2, dated Jun. 22, 2020, 9 pages.

*Primary Examiner* — Tulsidas C Patel
*Assistant Examiner* — Rashad H Johnson
(74) *Attorney, Agent, or Firm* — Cantor Colburn LLP

(57) ABSTRACT

A stator includes a core and a coolant jacket. The core has an outer surface extending about a rotation axis and defining one or more surface discontinuity within the outer surface. The coolant jacket is deposited on the outer surface of the core and has two or more layers conformally disposed on the outer surface of the core, the coolant jacket inhabiting the one or more surface discontinuity. Electrical machines, motor-type electrical machines, and methods of making stators are also described.

17 Claims, 7 Drawing Sheets

(56) References Cited

U.S. PATENT DOCUMENTS

| | | | |
|---|---|---|---|
| 2009/0127946 A1* | 5/2009 | Fee et al. | H02K 5/20 310/64 |
| 2012/0074798 A1* | 3/2012 | Bywaters et al. | H02K 1/18 310/54 |
| 2012/0080964 A1* | 4/2012 | Bradfield et al. | H02K 1/20 310/58 |
| 2014/0246931 A1* | 9/2014 | Chamberlin | H02K 5/20 310/54 |
| 2014/0246933 A1* | 9/2014 | Chamberlin et al. | H02K 9/19 310/54 |
| 2016/0352201 A1 | 12/2016 | Ranjan et al. | |
| 2017/0271954 A1 | 9/2017 | Hanumalagutti et al. | |
| 2017/0346370 A1 | 11/2017 | Sentis et al. | |
| 2018/0233977 A1 | 8/2018 | Volkmuth et al. | |
| 2018/0278125 A1 | 9/2018 | Huang et al. | |

\* cited by examiner

ELECTRICAL MACHINES WITH LIQUID COOLING

BACKGROUND

The subject matter disclosed herein generally relates to electrical machines, and more particularly to electrical machines with liquid cooling.

Electrical machines commonly include electrically conductive windings supported by core. In motors electrical current is generally applied to the windings to generate magnetic flux, which interacts with a rotor supported for rotation relative to the core to exert torque on the rotor. In generators rotation of a rotor with magnetic elements supported for rotation relative to the core induces current flow within the windings, which is communicated as electric power. In each case, the electrical current flowing through the windings generates heat due to electromagnetic losses in both the windings and the core. The heat is typically rejected to the external environment through the electrical machine frame, which is generally provided with fins that define channels therebetween. The fins increase the surface area of the frame, increasing heat rejection during operation of the electrical machine.

In some electrical machines a liquid coolant is used for removing heat from the electrical machine, generally though a jacket with coolant channels that is attached to the core using a shrink fit process. The coolant channels are typically cut into the jacket using a subtractive technique and enclosed within a sufficient amount of jacket material to withstand the hoop stress associated with the shrink fit process. Alternatively, a coolant conduit can be wrapped about the core to conduct heat from the core into a coolant traversing the conduit. In both arrangements heat conducted from the core traverses an interface defined between the conduit and the core.

Such systems and methods have generally been satisfactory for their intended purposes. However, there remains a need for improved electrical machines and methods of making electrical machines. The present disclosure provides a solution to this need.

BRIEF SUMMARY

According to one embodiment, a stator is provided. The stator includes a core and a coolant jacket. The core has an outer surface extending about a rotation axis and outer surface defines within the outer surface one or more surface discontinuity. The coolant jacket is deposited on the outer surface of the core, defines a coolant channel, and has two or more layers conformally disposed on the outer surface of the core and inhabiting the one or more surface discontinuity.

In addition to one or more of the features described above, or as an alternative, further embodiments may include that a first layer of the plurality of layers comprises a fused metallic particulate and a second layer of the plurality of layers comprises a fused metallic particulate, the second layer being fused to the first layer.

In addition to one or more of the features described above, or as an alternative, further embodiments may include that the two or more layers bound the coolant channel.

In addition to one or more of the features described above, or as an alternative, further embodiments may include that one or more of the plurality of layers is arranged radially between the coolant channel and the outer surface of the core.

In addition to one or more of the features described above, or as an alternative, further embodiments may include that the outer surface of the core bounds the coolant channel.

In addition to one or more of the features described above, or as an alternative, further embodiments may include that the coolant channel extends helically about the rotation axis.

In addition to one or more of the features described above, or as an alternative, further embodiments may include that the coolant channel has a first flow area and a second flow area, the first flow area being larger in size than the second flow area.

In addition to one or more of the features described above, or as an alternative, further embodiments may include that the core has a first end portion, an axially opposite second end portion, and an intermediate portion coupling the first end portion to the second end portion, the first flow area being defined along in the intermediate portion of the core and the second flow area being defined along the first end portion or the second end portion of the core.

In addition to one or more of the features described above, or as an alternative, further embodiments may include that the coolant channel tapers in flow area size between the first flow area and the second flow area along a length of the coolant channel.

In addition to one or more of the features described above, or as an alternative, further embodiments may include a heat transfer structure arranged within the coolant channel, the heat transfer structure being selected from a group including a turbulator, a riblet, and a spire.

In addition to one or more of the features described above, or as an alternative, further embodiments may include that the heat transfer structure is defined by the outer surface of the core.

In addition to one or more of the features described above, or as an alternative, further embodiments may include that the heat transfer structure is defined by at least one of the plurality of layers of the coolant channel.

In addition to one or more of the features described above, or as an alternative, further embodiments may include that the heat transfer structure is formed from a fused particulate and is spaced apart from the coolant jacket by a portion of the outer surface of the core.

In addition to one or more of the features described above, or as an alternative, further embodiments may include that the first layer has a radial thickness that is smaller than a radial thickness of the second layer.

In addition to one or more of the features described above, or as an alternative, further embodiments may include a liquid coolant disposed within the coolant channel, a winding extending about the rotation axis and arranged radially inward of the outer surface of the core, and a rotor arranged radially inward of the core and supported for rotation about the rotation axis.

In another embodiment an electrical machine is provided. The electrical machine includes a stator as described above, wherein a first layer of the plurality of layers comprises a fused metallic particulate, wherein a second layer of the plurality of layers comprises a fused metallic particulate, wherein the second layer is fused to the first layer, wherein the core comprises a steel material, wherein the coolant jacket comprises a metallic material. A rotor is arranged radially inward of the core and supported for rotation about the rotation axis.

In addition to one or more of the features described above, or as an alternative, further embodiments may include that the coolant channel has a first flow area and a second flow area, the first flow area greater than the second flow area, the core further comprising a heat transfer structure arranged within the coolant channel.

In addition to one or more of the features described above, or as an alternative, further embodiments may include a motor-type electrical machine having a stator as described above.

In a further embodiment, a method of making a stator is provided. The method includes, at a core having an outer surface extending about a rotation axis, conformally depositing a coolant jacket on the outer surface of the core by depositing a first layer on the outer surface of the core using an additive manufacturing technique, depositing a second layer over at least one of the outer surface of the core and the first layer using the additive manufacturing technique, and defining a coolant channel within the coolant jacket during the depositing of the first layer and the second layer using the additive manufacturing technique.

In addition to one or more of the features described above, or as an alternative, further embodiments may include defining a heat transfer structure within the coolant channel, wherein the heat transfer structure is defined within the outer surface of the core using a subtractive technique, or wherein the heat transfer structure is defined by at least one of the plurality of layers of the coolant jacket, or wherein the heat transfer structure is formed from a fused particulate and is spaced apart from the coolant jacket by a portion of the outer surface of the core.

Technical effects of the present disclosure include limiting (or eliminating entirely) thermal resistance between the electrical machine frame and the coolant jacket. In certain embodiments the present disclosure provides the capability to orient the coolant channels of the coolant jacket to heat communication characteristics of the electrical machine. In accordance with certain embodiments the diameter of the electrical machine and/or the weight of the coolant jacket is relatively low due to the core of the electrical machine bounding one or more of the coolant channels defined by the coolant jacket.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF DRAWINGS

The following descriptions should not be considered limiting in any way. With reference to the accompanying drawings, like elements are numbered alike.

DETAILED DESCRIPTION

Figure 1:
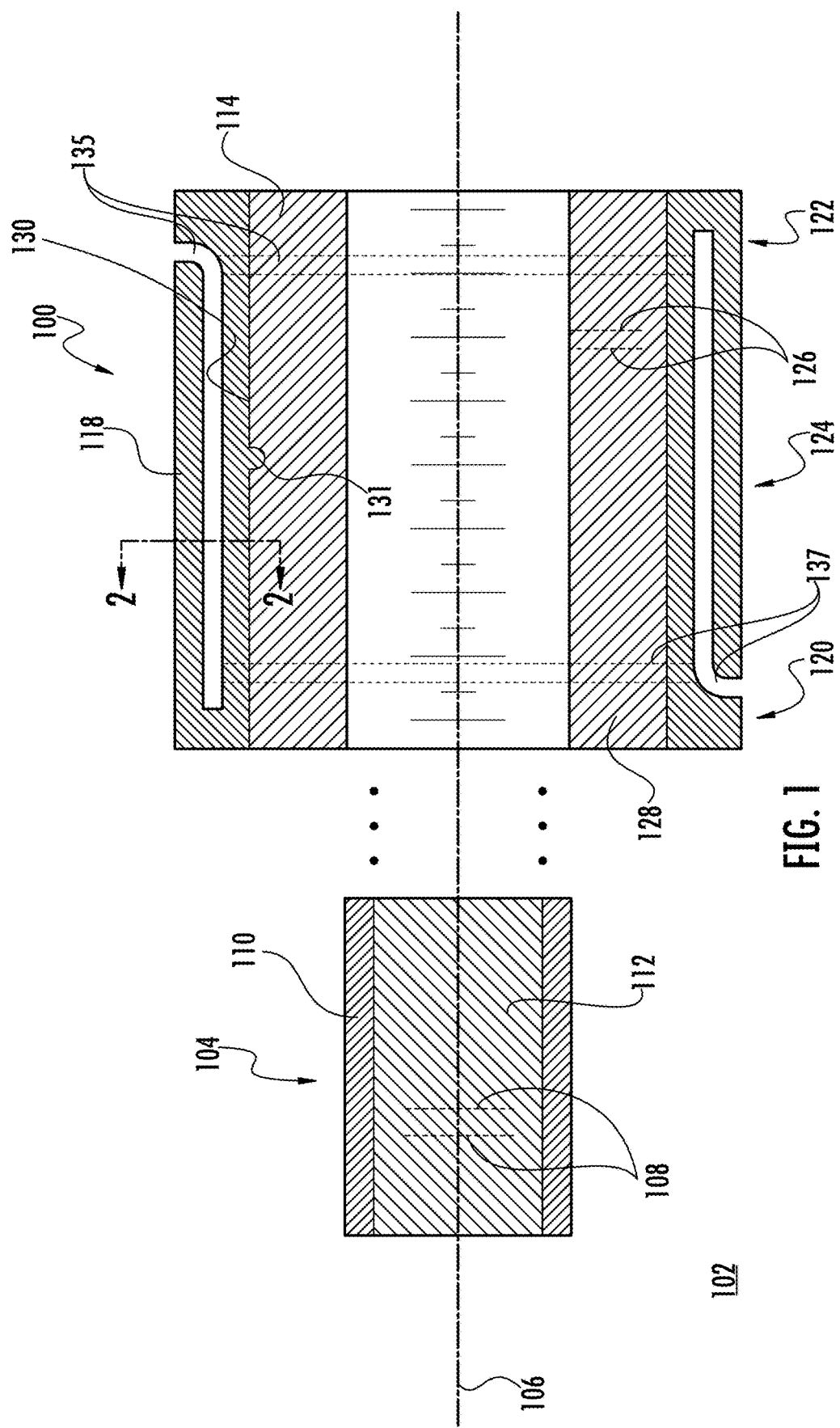
FIG. 1 is a cross-sectional view of an electrical machine constructed in accordance with the present disclosure, showing a rotor exploded away from a stator with a core and a coolant jacket.

Reference will now be made to the drawings wherein like reference numerals identify similar structural features or aspects of the subject disclosure. For purposes of explanation and illustration, and not limitation, a partial view of an exemplary embodiment of a stator for an electrical machine in accordance with the disclosure is shown in FIG. 1 and is designated generally by reference character 100. Other embodiments of stators, electrical machines, motor-type electrical machines, and methods of making stators in accordance with the present disclosure are shown in FIGS. 2-10, as will be described. The systems and methods described herein can be used for liquid-cooled electrical machines, such as motor-type electrical machines in aircraft electrical systems, though the present disclosure not limited motor-type electrical machines or to aircraft electrical systems in general.

In addition to the stator 100, a rotor 104 is illustrated in FIG. 1. When combined, the stator 100 and the rotor 104 form portions of an electrical machine 102, such as a motor-type electrical machine. The rotor 104 is supported for rotation about a rotation axis 106 and includes a plurality of sheets 108 and one or more magnetic elements 110. The plurality of sheets 108 are axially stacked along the rotation axis 106 and are formed from a magnetic steel material 112. The one or more magnetic elements 110 may be fixed to the rotor 104 such that they rotate with the rotor 104 about the rotation axis 106. It is contemplated that the one or more magnetic elements 110 can be a permanent magnet and/or a coil, as suitable for an intended application.

The stator 100 includes a core 114, a winding 116 (shown in FIG. 2), and a coolant jacket 118. The winding 116 is supported within core 114 at a radially inner location. The core 114 extends circumferentially about the rotation axis 106 and has a first end portion 120, a second end portion 122, and an intermediate portion 124. The second end portion 122 is arranged on an end of the core 114 axially opposite the first end portion 120. The intermediate portion 124 of the core 114 couples the first end portion 120 of the core 114 to the second end portion 122 of the core 114. It is contemplated that the core 114 include a plurality of sheets 126 laminated to one another and axially stacked along the rotation axis 106. It is contemplated that the core 114 be formed by a steel material 128, such as electric steel by way of non-limiting example. Although described herein as having a laminated core construction, it is also contemplated that cores with other structures can also benefit from the present disclosure, such as forged and sintered powder metal cores by way of non-limiting example.

The coolant jacket 118 is deposited on an outer surface 130 of the core 114. More specifically, the coolant jacket 118 has a first layer 134 (shown in FIG. 2) and one or more second layer 136 (shown in FIG. 2) conformally disposed on the outer surface 130 of the core 114, the coolant jacket 118 inhibiting the one or more surface discontinuity 131 defined within the outer surface 130 of the core 114. As used herein the term "inhabit" refers to volumetrically occupy space defined by the surface discontinuity, and in proximity thereof, that would be occupied at least in part by air were a coolant jacket attached to the core 114 using a shrink-fit process.

Figure 2:
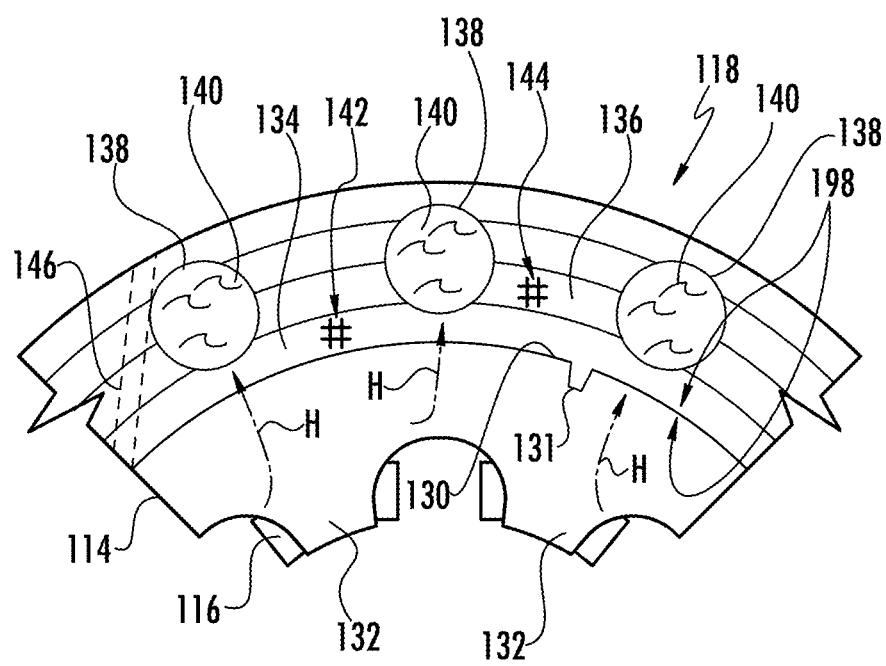
FIG. 2 is partial cross-sectional view of the stator of FIG. 1, showing coolant channels defined by the coolant jacket.

With reference to FIG. 2, a portion of the stator 100 is shown. The core 114 is radially bounded by the outer surface 130 and two or more stator teeth 132. The two or more stator teeth 132 are arranged radially inward of the outer surface 130. Coils of the winding 116 are wrapped about the respective stator teeth 132 and are connected electrically with one another in series (or parallel) to communicate magnetic flux to the rotor 104 (shown in FIG. 1). As will be appreciated by those of skill in the art in view of the present disclosure, application of electric current to the winding 116 generates heat H—both from resistive heating of the conductors forming the winding 116 and from magnetic flux generated by the current flow or magnetic elements carried by the rotor (e.g., permanent magnets and/or windings)—which is rejected to the environment external to the stator 100.

The coolant jacket 118 includes a plurality of layers, e.g., the first layer 134 and the one or more second layer 136, and is arranged to communicate the heat H to the external environment. In this respect the coolant jacket 118 defines at least partially a plurality of coolant channels 138 within the coolant jacket 118. A liquid coolant 140 may be provided to the coolant channels 138 to receive the heat H. The liquid coolant 140 traverses the coolant channels 138, receives the heat H from the core 114, and carries the heat H therewith for communication to the external environment. Examples of suitable liquid coolants include water, water-glycol, refrigerants, liquid metal, oil, brine, glycol-containing mixtures, and kerosene-based fuels.

The first layer 134 includes a fused metallic particulate 142 distributed radially outward of the core 114. The one or more second layer 136 includes an fused metallic particulate 144, also distributed radially outward of the core 114, and is additionally fused with the underlying first layer 134 to form a monolithic and unitary stator 100. It is contemplated that either (or both) the fused metallic particulate 142 and the fused metallic particulate 144 include a metallic material 146, for aluminum or titanium and/or alloys thereof. In certain embodiments metallic material 146 is selected to additionally limit, e.g., through the use of aluminum or an aluminum alloy, the weight of the coolant jacket 118 while providing good thermal communication through the coolant jacket 118.

The first layer 134 and the one or more second layers 136 are conformally disposed to the outer surface 130 of the core 114. More specifically, the first layer 134 and the one or more second layer 136 are deposited to the core 114 and bound, at least partially, the coolant channels 138. As shown in FIG. 2 the first layer 134 is deposited on the outer surface 130 of the core 114 and circumferentially about the core 114, and the one or more second layer 136 is deposited on the first layer 134 and circumferentially about the outer surface 130 of the core 114 at a location radially outward of the first layer 134. Although shown an described in a specific orientation, e.g., circumferentially about one another and the core 114, other orientations of the first layer 134 and one the second layer 136 are possible within the scope of the present disclosure.

It is contemplated that the first layer 134 and one or more second layers 136 be deposited using an additive manufacturing technique. Examples of suitable additive manufacturing techniques include cold spray techniques, wire addition techniques, and powder bed fusion techniques by way of non-limiting examples. Deposition of the first layer 134 and the one or more second layer 136 reduces the thermal resistance at an interface 148 defined between the coolant jacket 118 and the core 114 relative to shrink-fit cores having coolant channel formed using a subtractive process of similar geometry.

In certain embodiments the thermal resistance presented by the interface 148 can be on the order of about 70% less than that presented by a coolant jacket applied by a shrink fit process, which is unexpectedly better than expected. Without wishing to be bound by a particular theory, applicants believe that this unexpected improvement in thermal resistance is attributable to the tendency of deposited materials to displace gas resident in micro-features, e.g., the surface discontinuity 131, defined on the outer surface 130 of the core 114 resultant from the manufacturing process, e.g., the stamping process used to from the plurality of sheets 126, rather than impound the gases between a coolant jacket and the core 114 as can occur when a discrete coolant jacket structure is assembled to the core 114 using a shrink-fit technique.

With continuing reference to FIG. 1, it is contemplated that the first layer 134 and the one or more second layer 136 define an inlet manifold 135 and or an outlet manifold 137. The inlet manifold 135 and/or the outlet manifold 137 in turn fluidly connect the coolant channels 138 to a singular coolant inlet and/or coolant outlet. Forming the inlet manifold 135 and/or the outlet manifold 137 can simplify the assembly of the stator 100 as there is no need to attach a coolant manifold as discrete structure. Forming the inlet manifold 135 and/or the outlet manifold 137 can also improve the reliability of electrical machines employing the stator 100, e.g., the electrical machine 100 (shown in FIG. 1), as fewer coolant conduit connections need to be made during assembly—each of which can present a risk of coolant leakage.

Figure 3A:
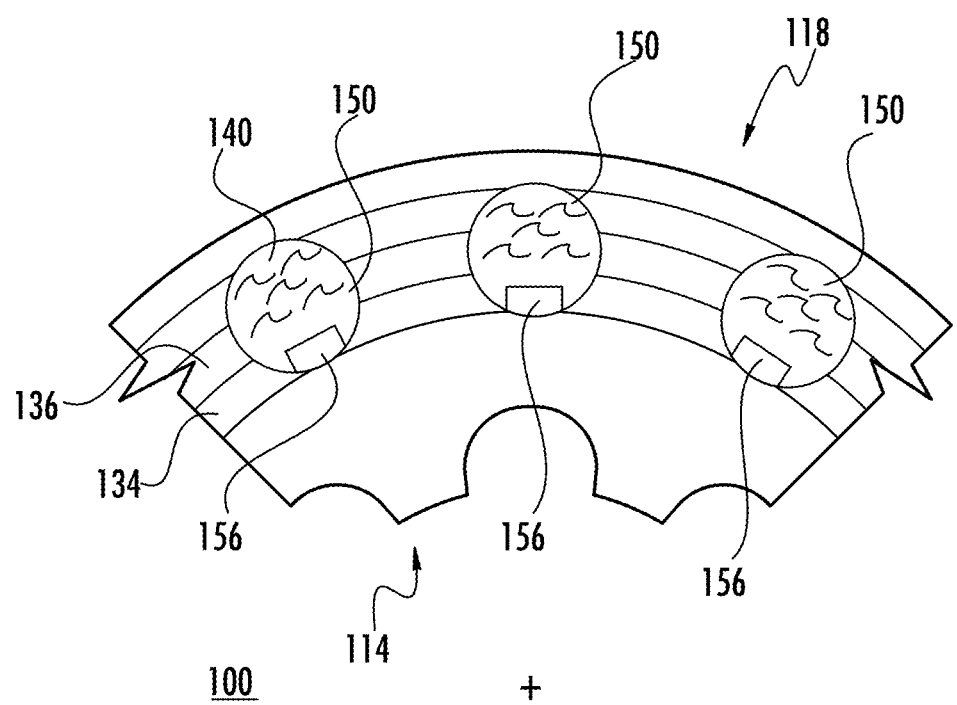
FIGS. 3A-3D are partial cross-sectional views of the stator of FIG. 1 according to embodiments, showing coolant channels having heat transfer structures, thin intermediate layers separating the coolant channel from the core, and coolant channels bounded by the core, respectively.

With reference to FIGS. 3A-3D, embodiments of the stator 100 are shown. As shown in FIG. 3A, in certain embodiments the coolant jacket 118 can define a coolant channel 150 having a heat transfer feature 156. In this respect the coolant channel 150 is similar to the coolant channel 138 (shown in FIG. 2) and additionally includes the heat transfer structure 156. The heat transfer structure 156 is defined within the coolant channel 150 and is formed using an additive manufacturing technique, e.g., the additive manufacturing technique used to form the first layer 134 and/or the second layer 136. During service the heat transfer surface 158 increases the surface area otherwise presented by the coolant jacket 118 to the liquid coolant 140 traversing the coolant channel 150. The increased surface area provided by the heat transfer feature 156 increases the rate of heat transfer between the coolant jacket 118 and the liquid coolant 140, increasing the rate of heat rejection from the core 114 to the liquid coolant 140—allowing for increased rating of the electrical machine 100.

Figure 3B:
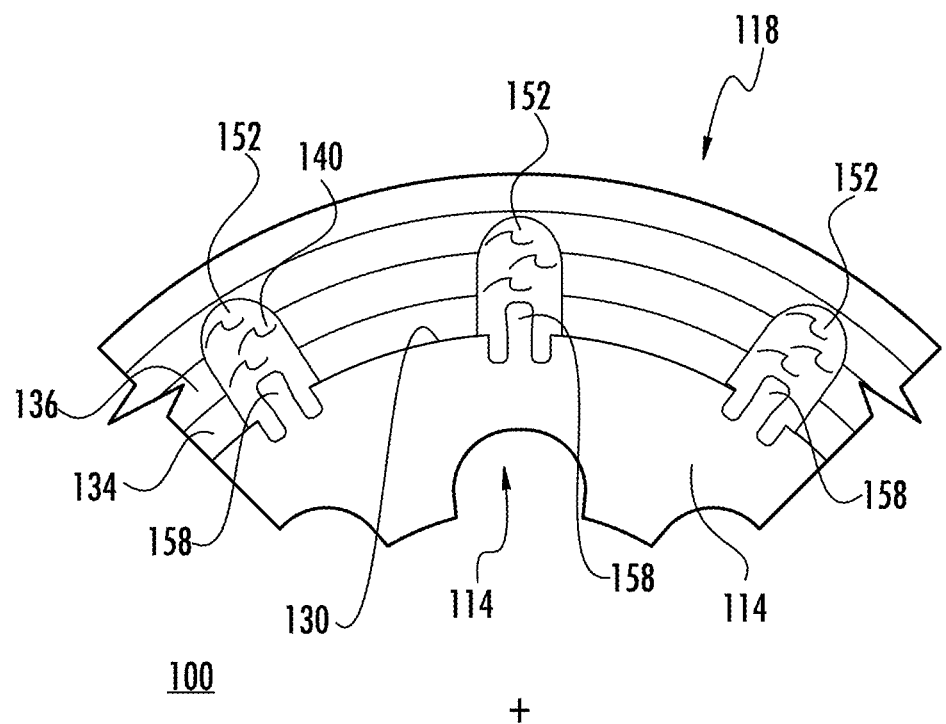

As shown in FIG. 3B, it is contemplated that the coolant jacket 118 and the core 114 can collectively define a coolant channel 152. The coolant channel 152 is similar to the coolant channel 138 (shown in FIG. 2) and additionally includes a heat transfer structure 158. The heat transfer structure 158 is defined radially on (and within) the outer surface 130 of the core 114. It is contemplated that the heat transfer feature 158 be defined using a subtractive manufacturing technique, such as a milling or stamping technique, increasing the surface area presented by the core 114 to the liquid coolant 140 traversing the coolant channel 152. The increased surface area provided by the heat transfer feature 158 increases the rate of heat transfer between the core 114 and the liquid coolant 140, increasing the rate of heat rejection from the core 114 to the liquid coolant 140 traversing the coolant channel 138 during operation of the electrical machine 100.

Figure 3C:
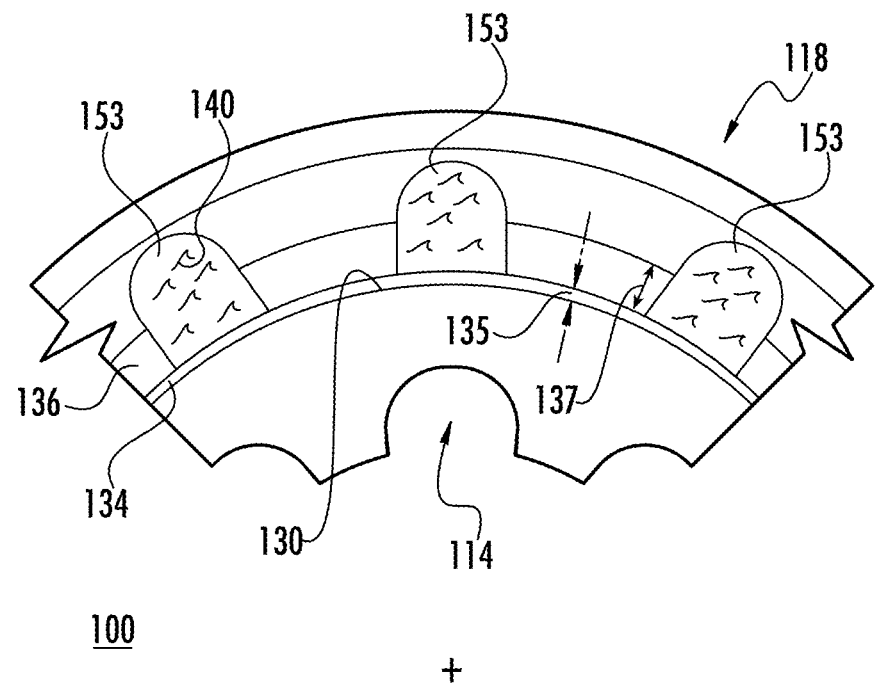

As shown in FIG. 3C, it is also contemplated that, in accordance with in certain embodiments, the coolant jacket 118 can define a coolant channel 153 with a thin coolant jacket layer separating the coolant channel 153 from the core 114. In this respect the coolant channel 153 is similar to the coolant channel 138 (shown in FIG. 2) and additionally includes a thin first layer 134. The thin first layer 134 has a radial thickness 135 that is smaller than a radial thickness 137 of the one or more second layers 136. The thin first layer 134 allows the coolant jacket 118 to be relatively lightweight relative to a coolant jacket fit assembles to the core 114 using a shrink-fit technique and still provide a fluid-tight seal between the coolant channel 153 and the core 114. This prevents infiltration of the liquid coolant 140 into the core 114 via leak paths that may be present between the laminations, e.g., the laminations 126 (shown in FIG. 1), forming the core 114.

Figure 3D:
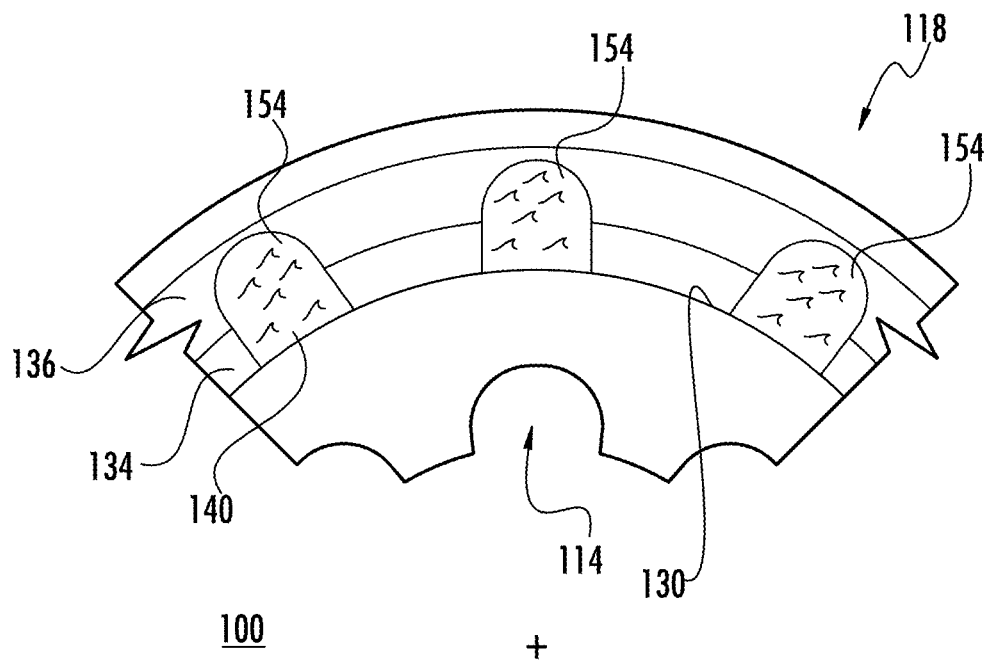

As shown in FIG. 3D, in further embodiments the coolant jacket 118 can define one or more coolant channel 154 bounded by the outer surface 130 of the core 114. In this respect the coolant channel 154 is similar to the coolant channel 138 (shown in FIG. 2) and is additionally bounded by a portion of the outer surface 130 of the core 114. Bounding a portion of the outer surface 130 of the core 114, the liquid coolant 140 flowing through the coolant channel 154 flows directly across the outer surface 130 of the core 114. This eliminates entirely the thermal resistance associated with the interface that would otherwise be present between a coolant jacket assembled to the core 114 using a shrink fit technique and the core 114, increasing the rate of heat transfer from the core 114 into the liquid coolant 140 within the coolant channel 154. It can also limits the radial thickness of the coolant jacket 118, limiting weight of the stator 100.

Figure 4:
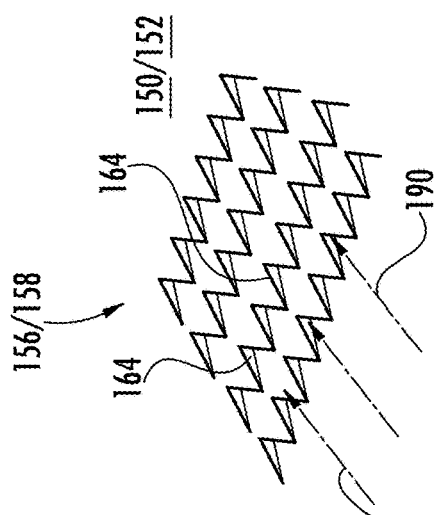
FIGS. 4-6 are perspective views of implementations of the heat transfer structures of FIGS. 3A and 3B, showing turbulators, riblets, and spires defined using additive manufacturing techniques and subtractive techniques, respectively.
Figure 5:
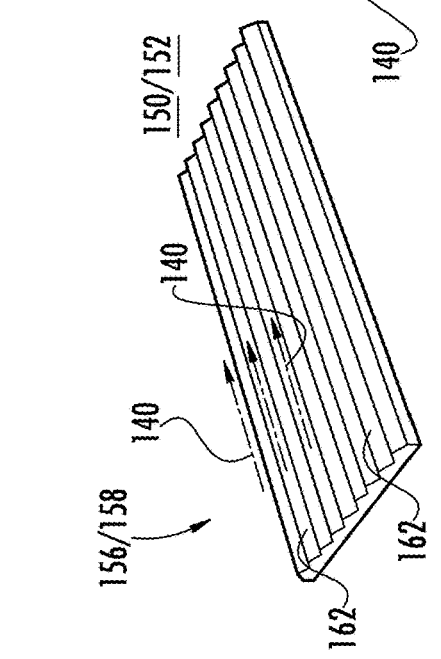
Figure 6:
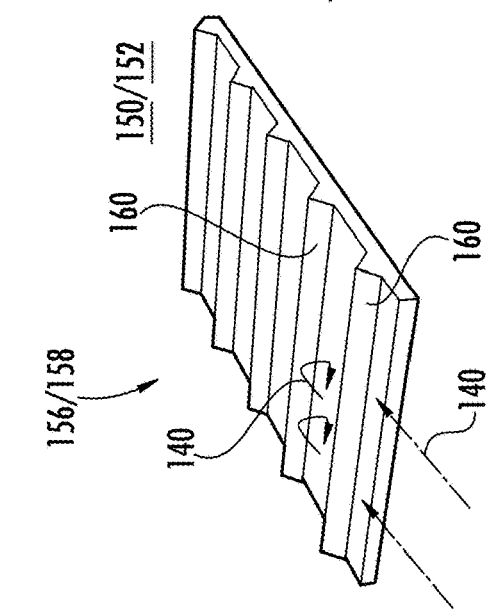

With reference to FIGS. 4-6, the heat transfer structures 156 and the heat transfer structure 158 are shown. As shown in FIG. 4, the heat transfer structure 156 and/or the heat transfer structure 158 can include one or more turbulator 160. The one or more turbulator 160 is arranged transversely with respect to flow of the liquid coolant 140 through the coolant channel 150 (shown in FIG. 3A) and/or the coolant channel 152 (shown in FIG. 3B). In certain embodiments the one or more turbulator 160 can be an artifact, e.g., unintentional consequence of tool wear, from the stamping process used to for the sheets 126 (shown in FIG. 1) forming the core 114 (shown in FIG. 1). In accordance with certain embodiments the one or more turbulator 160 can formed using the additive manufacturing technique used to conformally dispose the first layer 134 (shown in FIG. 2) and/or the one or more second layer 136 (shown in FIG. 2) on the outer surface 130 of the core 114. As will be appreciated by those of skill in the art in view of the present disclosure, the transverse orientation of the one or more turbulator 160 relative to the direction of the flow of the liquid coolant 140 through the coolant channel 152 and/or the coolant channel 154 introduces turbulence within the flow of the liquid coolant 140, promoting fluid mixing and increasing the rate of heat transfer between the stator 100 (shown in FIG. 1) and the liquid coolant 140.

As shown in FIG. 5, the heat transfer structure 156 and/or the heat transfer structure 158 can include one or more riblet or fin 162. The one or more riblet of fin 162 is arranged along the direction of flow of the liquid coolant 140, increasing the surface area of the coolant jacket 118 (shown in FIG. 1) or the core 114 (shown in FIG. 1) that the liquid coolant 140 contacts while traversing the stator 100 (shown in FIG. 1). This increases the rate of heat transfer between the coolant jacket 118 or the core 114 and the liquid coolant 140. It is contemplated that the one or more riblet or fin 162 can be axially discontinuous and circumferentially displaced within the coolant channel relative to another riblet or fin 162.

As shown in FIG. 6, the heat transfer structure 156 and/or the heat transfer structure 158 can include one or more spire 164. The one or more spire 164 protrude radially into the liquid coolant 140, increasing the surface area of the coolant jacket 118 (shown in FIG. 1) or the core 114 (shown in FIG. 1) that the liquid coolant 140 contacts while traversing the stator 100 (shown in FIG. 1), the one or more spire 164 increasing increase the rate of heat transfer between the coolant jacket 118 or the core 114 and the liquid coolant 140.

Figure 7:
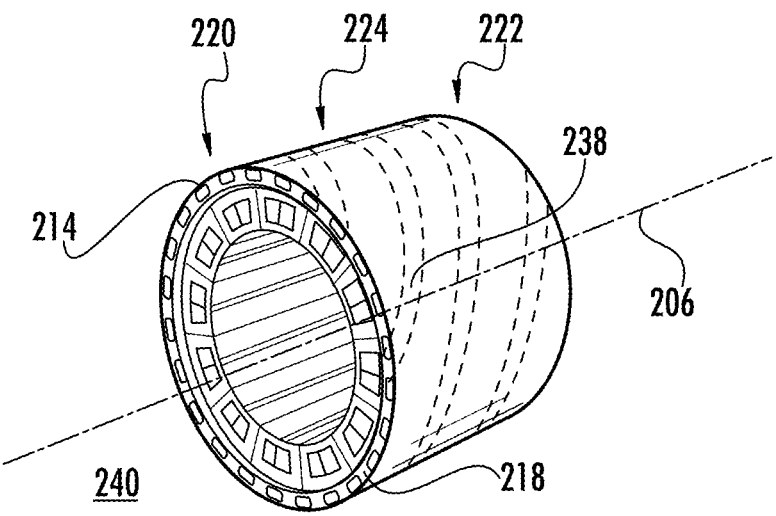
FIG. 7 is a perspective view of the stator of FIG. 1, showing a stator with a coolant channel defined within coolant jacket that extends helically about the core of the stator.

With reference to FIG. 7, a stator 200 is shown. The stator 200 is similar to the stator 100 (shown in FIG. 1) and additionally includes a coolant jacket 218. The coolant jacket 218 defines at least partially a coolant channel 238. The coolant channel 238 extends helically about the rotation axis 206. More specifically, the coolant jacket 218 defines a plurality of coolant channels 244 extending helically about the rotation axis 206 spanning at least an intermediate portion 224 of the core 214. The helical path increases the length of the coolant channel 244 with respect to the axial length of core 214, increasing the amount of heat communicated to the liquid coolant 140 (shown in FIG. 2) as the liquid coolant traverses the coolant channel 238. As shown in FIG. 7 the helical path of the coolant channel 238 span the first end portion 220, the intermediate portion 224, and the second end portion 222 of the core 214.

Figure 8:
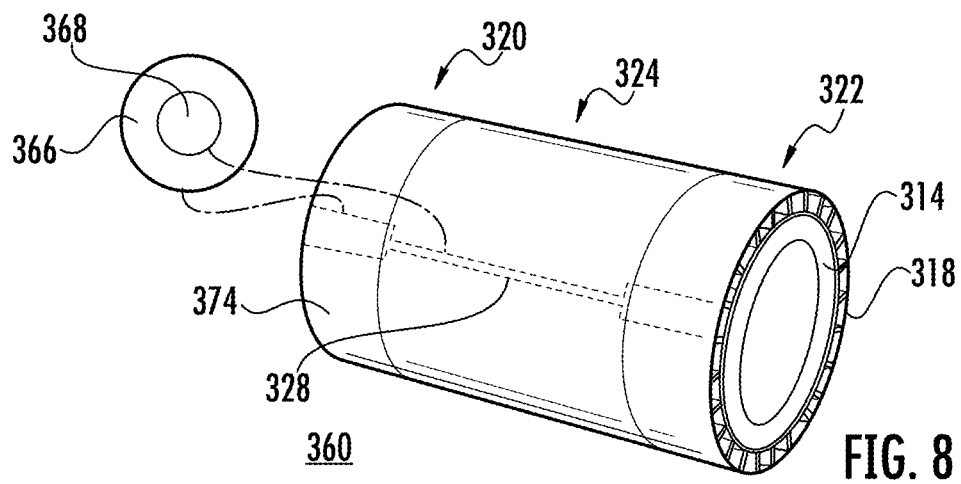
FIGS. 8 and 9 are perspective views of the stator of FIG. 1, showing stators with coolant channels defined within the coolant jacket having flow areas that changes along the length of the stator, respectively.

With reference to FIG. 8, a stator 300 is shown. The stator 300 is similar to the stator 100 and additionally has a coolant jacket 318. The coolant jacket 318 defines at least partially a coolant channel 338. The coolant channel 338 has a first flow area 366 and a second flow area 368. The first flow area 366 is greater than the second flow area 368. It is contemplated that the first flow area be defined by the coolant channel 344 at an axial location radially adjacent to an end turn 370 of a winding 316, e.g., radially adjacent to the first end portion 320 and/or the second end portion 322, and that the second flow area 362 be defined along the intermediate portion 324 of the core 314. Defining the first flow area 366 radially adjacent to the end turn 370 increases residency time of the liquid coolant 140 (shown in FIG. 2) at locations radially adjacent to the end turn 370, increasing the amount of heat removed from the end turn 370. As the end turn 370 of a winding can run hotter than the portion of the winding spanning the intermediate portion 324 of the core 314, the greater size of the first area 366 reduces the total range of temperature along the core 314 during operation electrical machines employing the stator 300.

Figure 9:
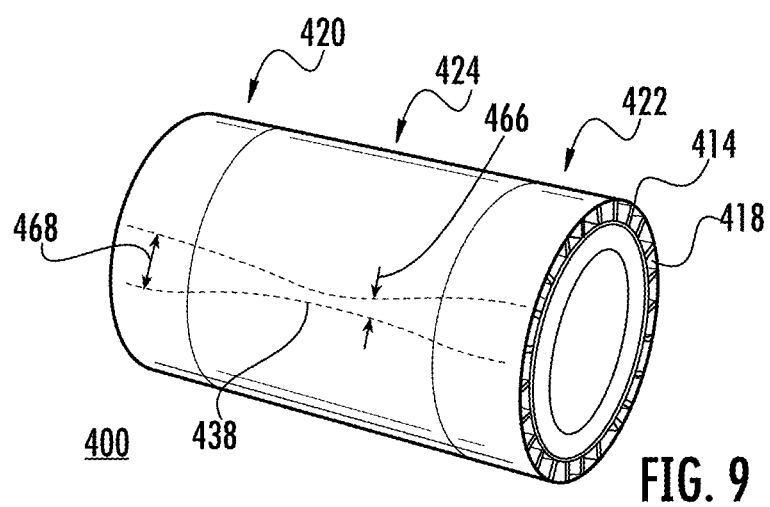

With reference to FIG. 9, a stator 400 is shown. The stator 400 is similar to the stator 100 (shown in FIG. 1) and additionally includes a coolant jacket 418. The coolant jacket 418 defines at least partially a coolant channel 444 having a first flow area 466 and a second flow area 468, the first flow area 466 having a greater area than the second flow area 468. Between the first flow area 466 and the second flow area 468 the coolant channel 438 tapers in flow area size. For example, between the first flow area 466 defined on the first end portion 420 of the core 414 the coolant channel 444 tapers to the second flow area 468 at a location along the intermediate portion 424 of the coolant channel 444. Tapering the coolant channel 438 graduates the resistance presented to the liquid coolant 140 (shown in FIG. 2) traversing the coolant channel 438, promoting laminar flow within the coolant channel 438 and limiting pressure loss in the liquid coolant 140 during traverse of the stator 400.

Figure 10:
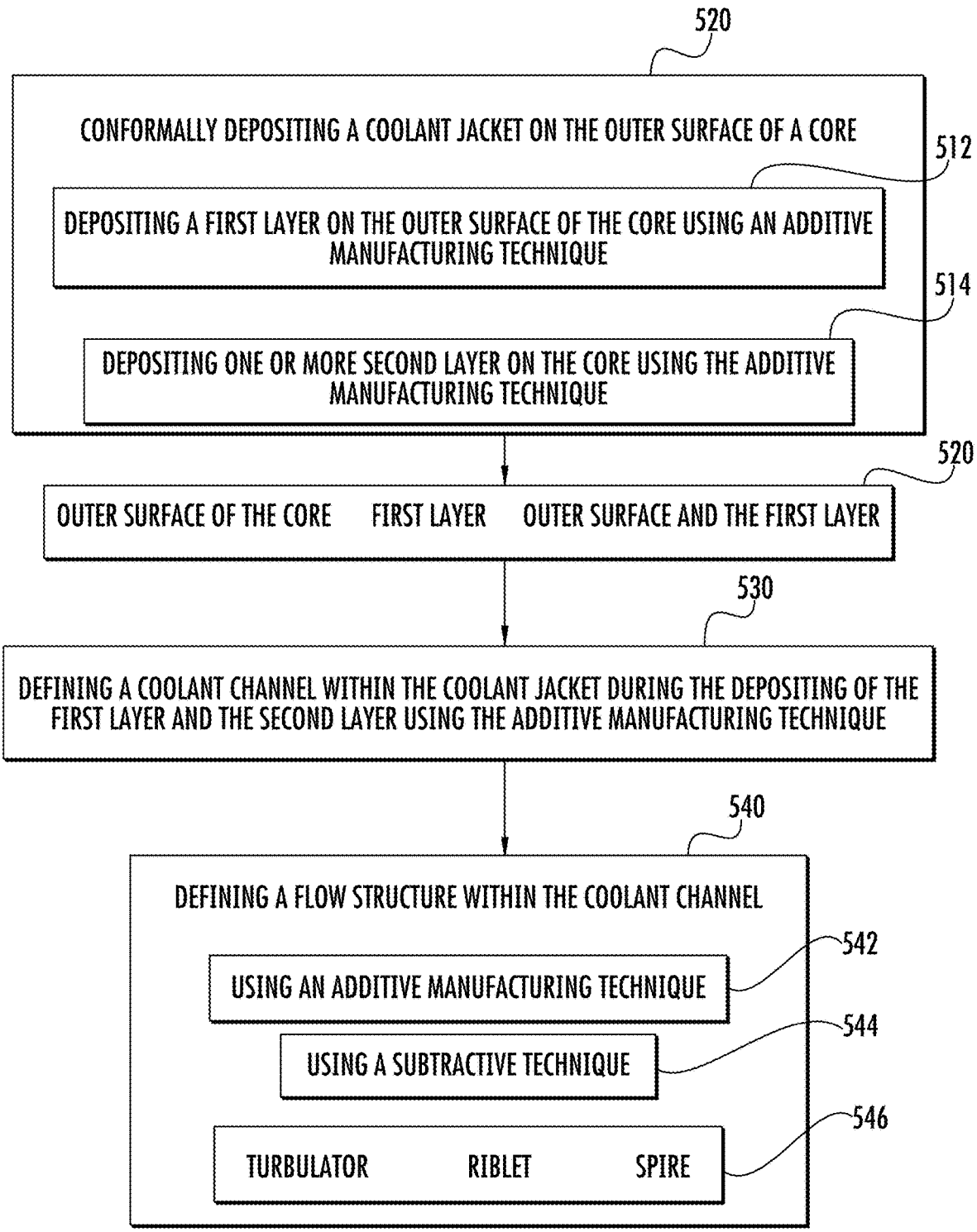
FIG. 10 is block diagram of a method of making a stator for an electrical machine, showing steps of the method.

With reference to FIG. 10, a method 500 of making a stator, e.g., the stator 100 (shown in FIG. 1), is shown. The method 500 includes conformally depositing a coolant jacket, e.g., the coolant jacket 118 (shown in FIG. 1), on the outer surface of a core, e.g., the outer surface 130 (shown in FIG. 2) of the core 114 (shown in FIG. 1), as shown with box 510. The coolant jacket is deposited conformally on the core by depositing a first layer using an additive manufacturing technique, e.g., the first layer 134 (shown in FIG. 2), on the outer surface of the core, as shown with box 512, and depositing one or more second layer, e.g., the second layer 136 (shown in FIG. 2), on the outer surface of the core, as shown with box 514. The second layer can be deposited on the outer surface of the core, the first layer, or both the outer surface of the core and the first layer, as shown with box 520. It is contemplated that the coolant jacket be deposited using an additive manufacturing technique, such a cold-spray additive technique, wire addition additive technique, or a laser deposition technique.

As shown with box 530, the method 500 includes defining a coolant channel within the coolant jacket during the depositing of the first layer and the one or more second layer using the additive manufacturing technique. In certain also embodiments a heat transfer structure, e.g., the heat transfer structure 156 (shown in FIG. 6), is defined within the coolant channel, as shown with box 540. As shown with box 542, the heat transfer structure can be defined using an additive manufacturing technique, e.g., the additive manufacturing technique used deposit the coolant jacket. As shown with box 544, the heat transfer structure can be defined using a subtractive manufacturing technique, such as with a stamping or milling operation by way of illustration and non-limiting example. It is contemplated that defining the heat transfer structure can include defining one or more of a turbulator, e.g., the one or more turbulator 160 (shown in FIG. 5), a riblet, e.g., the one or more riblet 162 (shown in FIG. 6), or the one or more spire 164 (shown in FIG. 7), as shown with box 550.

Electrical machines typically generate heat during operation due resistive heating of electrical conductors and magnetic flux communication. The heat is generally communicated to the external environment by conduction through the frame of the electrical machine frame to a fluid, and therethrough to the ambient environment. Since the rate of heat rejection through the frame can influence the rating of the electrical machine for a given level of current flow and/or magnetic flux, structures like fins, coolant tubes, or coolant jackets can be thermally coupled to the frame to route coolant fluid across the electrical device. Fins increase the area of the frame for heat rejection to the ambient environment while coolant tubes and coolant jackets sink heat from the electrical machine across an interface between the frame and coolant jacket.

In embodiments described herein electrical machines employ stators having a core and coolant jacket. The coolant jacket is conformally deposited over the outer surface of the core and at least partially defines therein a coolant channel. The coolant jacket includes two or more layers deposited on the core and/or one another, limiting the thickness of the coolant jacket by limiting (or eliminating entirely) the hoop stress associated with shrink-fitting the coolant jacket to the core. In certain embodiments the first layer and the one or more second are deposited such that the thermal resistance of the interface between the core and the coolant jacket is smaller than that of a shrink-fit coolant jacket—the interface having as much as 70% less thermal resistance than a shrink-fit coolant jacket in contemplated embodiments. In accordance with certain embodiment the coolant channel can be defined with non-linear share, such as a helical shape by way of illustration and not limitation. It is also contemplated that the coolant channel can widen and narrow according to coolant flow characteristics for the heat loading at given location on the core, the coolant channel widening at locations radially adjacent to the winding end turns for example.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A stator, comprising:
  a core with an outer surface extending about a rotation axis, wherein the outer surface defines one or more surface discontinuity therein;
  a coolant jacket deposited on the outer surface of the core and defining a coolant channel, wherein the coolant jacket comprises a plurality of layers conformally disposed on the outer surface of the core and inhabiting the one or more surface discontinuity; and
  a heat transfer structure arranged within the coolant channel, wherein the heat transfer structure is selected from a group including a turbulator, a riblet, and a spire, wherein the heat transfer structure is formed from a fused particulate and is spaced apart from the coolant jacket by a portion of the outer surface of the core.

2. The stator as recited in claim 1, wherein a first layer of the plurality of layers comprises a fused metallic particulate, wherein a second layer of the plurality of layers comprises a fused metallic particulate, wherein the second layer is fused to the first layer.

3. The stator as recited in claim 1, wherein the plurality of layers bound the coolant channel.

4. The stator as recited in claim 1, wherein at least one of the plurality of layers is arranged radially between the coolant channel and the outer surface of the core.

5. The stator as recited in claim 1, wherein the outer surface of the core bounds the coolant channel.

6. The stator as recited in claim 1, wherein the coolant channel extends helically about the rotation axis.

7. The stator as recited in claim 1, wherein the coolant channel has a first flow area and a second flow area, the first flow area being larger in size than the second flow area.

8. The stator as recited in claim 7, wherein the core has a first end portion, an axially opposite second end portion, and an intermediate portion coupling the first end portion to the second end portion, wherein the first flow area is defined along in the intermediate portion of the core, and wherein the second flow area is defined along the first end portion or the second end portion of the core.

9. The stator as recited in claim 7, wherein the coolant channel tapers in flow area size between the first flow area and the second flow area along a length of the coolant channel.

10. The stator as recited in claim 1, wherein the heat transfer structure is defined by the outer surface of the core.

11. The stator as recited in claim 1, wherein the heat transfer structure is defined by at least one of the plurality of layers of the coolant channel.

12. The stator as recited in claim 1, wherein a first layer of the plurality of layers has a radial thickness that is smaller than a radial thickness of a second layer of the plurality of layers.

13. The stator as recited in claim 1, further comprising:
a liquid coolant disposed within the coolant channel;
a winding extending about the rotation axis and arranged radially inward of the outer surface of the core; and
a rotor arranged radially inward of the core and supported for rotation about the rotation axis.

14. An electrical machine, comprising:
a stator as recited in claim 1, wherein a first layer of the plurality of layers comprises a fused metallic particulate, wherein a second layer of the plurality of layers comprises a fused metallic particulate, wherein the second layer is fused to the first layer;
wherein the core comprises a steel material, wherein the coolant jacket comprises a metallic material; and
a rotor arranged radially inward of the core and supported for rotation about the rotation axis.

15. The electrical machine as recited in claim 14, wherein the coolant channel has a first flow area and a second flow area, the first flow area being greater in size than the second flow area, and further comprising a heat transfer structure arranged within the coolant channel.

16. A motor-type electrical machine having a stator as recited in claim 1.

17. A method of making a stator, comprising:
at a core having an outer surface extending about a rotation axis, wherein the outer surface defines one or more surface discontinuity therein,
conformally depositing a coolant jacket on the outer surface of the core, the depositing comprising:
depositing a first layer on the outer surface of the core using an additive manufacturing technique;
depositing a second layer over at least one of the outer surface of the core and the first layer using the additive manufacturing technique;
defining a coolant channel within the coolant jacket during the depositing of the first layer and the second layer using the additive manufacturing technique, at least one of the first layer and the second layer inhabiting the one or more surface discontinuity, and
defining a heat transfer structure within the coolant channel, wherein the heat transfer structure is selected from a group including a turbulator, a riblet, and a spire, wherein the heat transfer structure is formed from a fused particulate and is spaced apart from the coolant jacket by a portion of the outer surface of the core.

\* \* \* \* \*